United States Patent
Jasuja et al.

(10) Patent No.: US 12,409,401 B2
(45) Date of Patent: Sep. 9, 2025

(54) PLEATED FILTRATION ASSEMBLY COMPRISING SPUNBONDED PREFILTER

(71) Applicant: 3M INNOVATIVE PROPERTIES COMPANY, St. Paul, MN (US)

(72) Inventors: Himanshu Jasuja, Woodbury, MN (US); Nathan E. Schultz, Woodbury, MN (US); Seth M. Kirk, Minneapolis, MN (US); Bryan L. Gerhardt, Woodbury, MN (US); Daniel C. Duan, St. Paul, MN (US); Michael R. Berrigan, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 352 days.

(21) Appl. No.: 18/011,959

(22) PCT Filed: Jun. 30, 2021

(86) PCT No.: PCT/IB2021/055876
§ 371 (c)(1),
(2) Date: Dec. 21, 2022

(87) PCT Pub. No.: WO2022/009028
PCT Pub. Date: Jan. 13, 2022

(65) Prior Publication Data
US 2023/0233968 A1 Jul. 27, 2023

Related U.S. Application Data

(60) Provisional application No. 63/049,506, filed on Jul. 8, 2020.

(51) Int. Cl.
*B01D 39/00* (2006.01)
*B01D 39/16* (2006.01)
(Continued)

(52) U.S. Cl.
CPC ....... *B01D 39/163* (2013.01); *B01D 46/0001* (2013.01); *B01D 46/522* (2013.01);
(Continued)

(58) Field of Classification Search
CPC .......... B01D 39/163; B01D 46/0001; B01D 46/522; B01D 2239/0407;
(Continued)

(56) References Cited

U.S. PATENT DOCUMENTS 4,215,682 A    8/1980  Kubik et al.
RE30,782 E    10/1981  Van
(Continued)

FOREIGN PATENT DOCUMENTS

CN    104001387         8/2014
CN    212119378 U      12/2020
(Continued)

OTHER PUBLICATIONS

International Search Report for PCT International Application No. PCT/IB2021/055876, mailed on Oct. 5, 2021, 4 pages.
(Continued)

*Primary Examiner* — T. Bennett Mckenzie
(74) *Attorney, Agent, or Firm* — Kenneth B. Wood

(57) ABSTRACT

A pleated multilayer air filter assembly including a primary filtration layer and a prefilter layer that are bonded to each other and are co-pleated with each other. The primary filtration layer includes meltblown electret fibers. The prefilter layer includes meltspun, spunbonded electret fibers that comprise a radially outer surface comprising polymethylpentene. The ratio of Effective Fiber Diameter of the fibers of the primary filtration layer to Effective Fiber Diameter of the fibers of the primary filtration layer is at least 1.5.

16 Claims, 2 Drawing Sheets

(51) Int. Cl.
*B01D 46/00* (2022.01)
*B01D 46/52* (2006.01)

(52) U.S. Cl.
CPC .............. *B01D 2239/0407* (2013.01); *B01D 2239/0435* (2013.01); *B01D 2239/0622* (2013.01); *B01D 2239/0627* (2013.01); *B01D 2239/0636* (2013.01); *B01D 2239/0668* (2013.01); *B01D 2239/1233* (2013.01); *B01D 2239/1291* (2013.01); *B01D 2275/10* (2013.01); *B01D 2279/50* (2013.01)

(58) Field of Classification Search
CPC .... B01D 2239/0435; B01D 2239/0622; B01D 2239/0627; B01D 2239/0636; B01D 2239/0668; B01D 2239/1233; B01D 2239/1291; B01D 2275/10; B01D 2279/50; B01D 39/1623; B01D 2239/0233; B01D 46/521; B01D 2239/0421; B01D 2239/0659; B01D 2239/0663; B01D 2239/0681
USPC .......................................................... 55/521
See application file for complete search history.

(56) References Cited

U.S. PATENT DOCUMENTS

| | | | |
|---|---|---|---|
| 4,375,718 A | 3/1983 | Wadsworth et al. | |
| RE31,285 E | 6/1983 | Van et al. | |
| 4,588,537 A | 5/1986 | Klaase et al. | |
| RE32,171 E | 6/1986 | Van | |
| 4,592,815 A | 6/1986 | Nakao | |
| 4,652,282 A | 3/1987 | Ohmori et al. | |
| 4,789,504 A | 12/1988 | Ohmori et al. | |
| 4,874,399 A | 10/1989 | Reed et al. | |
| 5,057,710 A | 10/1991 | Nishiura et al. | |
| 5,382,400 A * | 1/1995 | Pike ........................ | D04H 3/147 442/364 |
| 5,401,446 A | 3/1995 | Tsai et al. | |
| 5,496,507 A | 3/1996 | Angadjivand et al. | |
| 5,643,525 A | 7/1997 | Mcginty et al. | |
| 5,908,598 A | 6/1999 | Rousseau et al. | |
| 5,919,847 A | 7/1999 | Rousseau et al. | |
| 5,968,635 A | 10/1999 | Rousseau et al. | |
| 5,976,208 A | 11/1999 | Rousseau et al. | |
| 6,268,495 B1 | 7/2001 | Rousseau et al. | |
| 6,365,088 B1 | 4/2002 | Knight et al. | |
| 6,375,886 B1 | 4/2002 | Angadjivand et al. | |
| 6,406,657 B1 | 6/2002 | Eitzman et al. | |
| 6,454,986 B1 | 9/2002 | Eitzman et al. | |
| 6,607,624 B2 | 8/2003 | Berrigan et al. | |
| 6,743,464 B1 | 6/2004 | Insley et al. | |
| 6,824,718 B2 | 11/2004 | Eitzman et al. | |
| 7,390,351 B2 | 6/2008 | Leir et al. | |
| 7,691,168 B2 | 4/2010 | Fox et al. | |
| 7,765,698 B2 | 8/2010 | Sebastian et al. | |
| 8,162,153 B2 | 4/2012 | Fox et al. | |
| 8,240,484 B2 | 8/2012 | Fox et al. | |
| 8,506,669 B2 | 8/2013 | Fox et al. | |
| 8,613,795 B2 | 12/2013 | Li et al. | |
| 8,790,449 B2 | 7/2014 | Li et al. | |
| 9,174,159 B2 | 11/2015 | Sanocki et al. | |
| 10,464,001 B2 | 11/2019 | Kirk et al. | |
| 2003/0226792 A1 | 12/2003 | Tumbrink et al. | |
| 2008/0038976 A1 | 2/2008 | Berrigan et al. | |
| 2010/0229516 A1 * | 9/2010 | Fox .......................... | D04H 3/14 55/521 |
| 2010/0326902 A1 * | 12/2010 | Midkiff ..................... | D01F 6/46 428/411.1 |
| 2011/0137082 A1 | 6/2011 | Li et al. | |
| 2011/0162653 A1 | 7/2011 | Kirk et al. | |
| 2012/0272829 A1 * | 11/2012 | Fox .......................... | B01J 20/10 96/154 |
| 2014/0197095 A1 | 7/2014 | Demmel et al. | |
| 2015/0013295 A1 * | 1/2015 | Uchiyama ............... | B32B 27/30 442/364 |
| 2016/0256806 A1 | 9/2016 | Sanders et al. | |
| 2018/0085697 A1 | 3/2018 | Piry et al. | |
| 2019/0046910 A1 * | 2/2019 | Gregerson ............. | B01D 46/10 |
| 2019/0217239 A1 | 7/2019 | Gregerson et al. | |
| 2021/0154607 A1 * | 5/2021 | Shim .................... | B01D 39/163 |
| 2021/0308609 A1 * | 10/2021 | Rowlands .......... | B01D 39/2017 |

FOREIGN PATENT DOCUMENTS

| | | |
|---|---|---|
| EP | 2986354 B1 | 6/2017 |
| EP | 2818223 B1 | 7/2017 |
| EP | 2938420 B1 | 3/2018 |
| GB | 384052 A | 12/1932 |
| JP | 2003230807 A | 8/2003 |
| JP | 2007211376 A | 8/2007 |
| JP | 4141679 B2 | 8/2008 |
| JP | 2014226628 A | 12/2014 |
| JP | 2015085232 A | 5/2015 |
| JP | 2015213899 A | 12/2015 |
| JP | 2016128159 A | 7/2016 |
| JP | 2018040098 A | 3/2018 |
| JP | 2018071018 A | 5/2018 |
| JP | 2018079422 A | 5/2018 |
| TW | M597785 U * | 7/2020 |
| WO | 2015152207 A1 | 10/2015 |
| WO | 2016088691 A1 | 6/2016 |
| WO | 2016088692 A1 | 6/2016 |
| WO | 2017057148 A1 | 4/2017 |
| WO | 2020261034 A1 | 12/2020 |
| WO | 2020261150 A1 | 12/2020 |
| WO | 2021028851 A1 | 2/2021 |
| WO | 2022009028 A1 | 1/2022 |

OTHER PUBLICATIONS

Paajanen, "Understanding The Role Of The Gas In The Voids During Corona Charging Of Cellular Electret Films: A Way To Enhance Their Piezoelectricity", Journal of Physics D: Applied Physics, 2001, vol. 34, No. 16, pp. 2482-2488.

Sessler, "Electrets formed by low-energy electron injection", Journal of Electrostatics 1975, vol. 01, No. 02, pp. 111-123.

* cited by examiner

PLEATED FILTRATION ASSEMBLY COMPRISING SPUNBONDED PREFILTER

CROSS REFERENCE TO RELATED APPLICATIONS

This application is a national stage filing under 35 U.S.C. 371 of PCT/IB2021/055876, filed 30 Jun. 2021, which claims the benefit of U.S. Provisional Patent Application No. 63/049,506, filed 8 Jul. 2020, the disclosure of which is incorporated by reference in its/their entirety herein.

BACKGROUND

Spunbonded webs have found use in various applications, including backings for diapers and/or personal care articles, carpet backings, geotextiles and the like.

SUMMARY

Herein is disclosed a pleated multilayer air filter assembly comprising a primary filtration layer and a prefilter layer that are bonded to each other and are co-pleated with each other. The primary filtration layer comprises meltblown electret fibers. The prefilter layer comprises meltspun, spunbonded electret fibers that comprise a radially outer surface comprising polymethylpentene. The ratio of the Effective Fiber Diameter ratio of the fibers of the primary filtration layer to the Effective Fiber Diameter of the fibers of the primary filtration layer is at least 1.5.

All figures and drawings in this document are not to scale and are chosen for the purpose of illustrating different embodiments of the invention.

GLOSSARY AND DEFINITIONS

The term "spunbonded" refers to a non-woven web comprising a set of meltspun fibers that are collected as a fibrous web and subjected to one or more bonding operations (e.g. autogenous bonding) to hold the fibers together, The term "meltspun" refers to fibers that are formed by extruding molten filaments out of a set of orifices and passing the molten filaments through an air space (which may contain streams of moving air) to cool the filaments and then passing the filaments through an attenuation (i.e., drawing) unit to draw the filaments.

The term "meltblown" refers to fibers that are formed by extruding molten filaments out of a set of orifices into converging high velocity air streams introduced by way of air-blowing orifices located in close proximity to the extrusion orifices. Ordinary artisans will appreciate that meltspinning is distinguished from meltblowing and will further appreciate that meltspun fibers exhibit different properties from, and are thus distinguishable from, meltblown fibers.

The term "autogenous bonding" refers to melt-bonding of fibers performed at an elevated temperature (e.g., as achieved by use of an oven or a stream of high-temperature air) without the application of solid contact pressure onto the web. Such bonding may be performed by the directing of heated air onto/through the web.

The "Effective Fiber Diameter" of a fibrous web is a parameter obtained by a pressure-drop versus flowrate measurement as described later herein, that provides an estimate of the diameter of the fibers of the web.

The term "electret" fibers refers to fibers that comprise long-lived, at least quasi-permanent charges as described in detail later herein.

The term "polymethylpentene" as used herein refers to polymers (homopolymers and copolymers) containing at least 90 weight percent of 4-methyl-1-pentene (i.e., 4-methylpentan-1,2-diyl) monomer units:

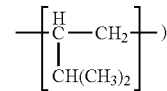

Polymethylpentene (often referred to herein for convenience as "PMP") is available e.g. from Mitsui Chemicals under the trade designation TPX.

DETAILED DESCRIPTION

Figure 1:
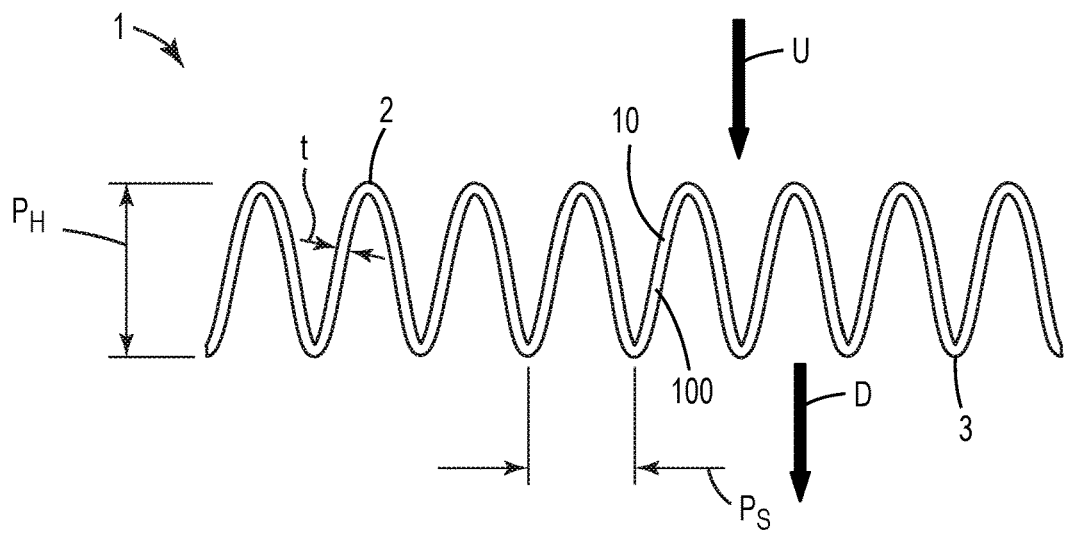
FIG. 1 is a side cross sectional view of an exemplary pleated multilayer air filter assembly.
Figure 2:
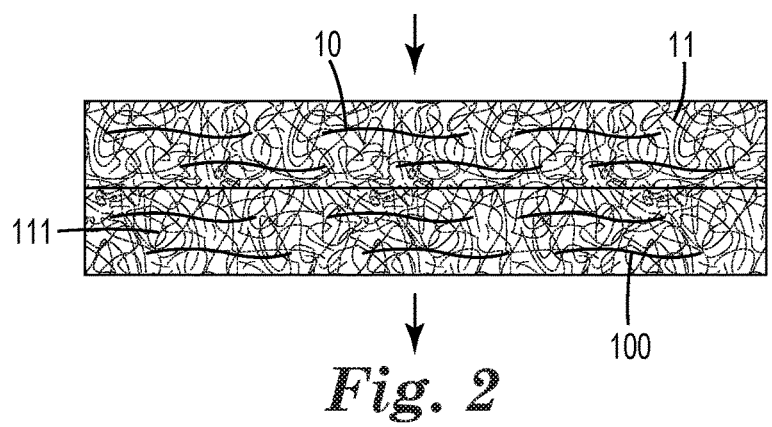
FIG. 2 is a side cross-sectional magnified view of a portion of the multilayer air filter assembly of FIG. 1, showing individual layers thereof.

Disclosed herein is a pleated multilayer air filter assembly 1. Multilayer assembly 1 comprises a primary filtration layer 100 and a prefilter layer 10 that is located on the upstream side of primary filtration layer 100. (The upstream and downstream sides of assembly 1 are indicated as U and D in FIG. 1, along with arrows showing the overall direction of air flow through the air filter assembly.) Layers 100 and 10 are shown in further detail in the magnified view of FIG. 2. Prefilter layer 10 comprises charged (electret) meltspun fibers 11 as discussed in detail later herein. Primary filtration layer 100 comprises charged (electret) meltblown fibers 111 as discussed in detail later herein.

Assembly 1 and layers 10 and 100 thereof are pleated. Details of pleat geometry are discussed with reference to the side view of FIG. 1, in which the pleated assembly is viewed along the pleat direction. In such a configuration, the pleat height (pleat amplitude) is the distance ($P_h$ in FIG. 1) from one pleat tip 2 to a nearest-neighbor pleat valley 3, along a direction that is orthogonal to the overall major plane of assembly 1. By definition, the pleat height will be at least 2 mm. In various embodiments, the pleat height can be at least 4, 6, 8, 10, 20, 30, or 40 mm. In further embodiments, the pleat height may be at most 45, 35, 25, 15, 12, 9 or 7 mm.

The pleat spacing ($P_s$ in FIG. 1) is the distance between nearest-neighbor same-side pleat tips 2 (or between nearest-neighbor same-side pleat valleys 3), along a direction that is in the major plane of assembly 1. By definition, the pleat spacing will be at least 2.0 mm. In various embodiments the pleat spacing may be at most 50, 45, 35, 25, 15, 12, 9, 7, or 5 mm. In further embodiments the pleat spacing may be at least 4, 6, 8, 10, 20, 30, or 40 mm.

Layers 10 and 100 are co-pleated, meaning that these layers are already in a state in which they are bonded to each other (thus comprising a multilayer assembly) when the pleating is performed. Layer 10 will thus exhibit pleating parameters (e.g. $P_h$ and $P_s$) that are very similar to those of layer 100.

Assembly 1 may exhibit a thickness (e.g. the combined thickness of layers 10 and 100) of any suitable value. In various embodiments, assembly 1 may exhibit a thickness in the range of from 0.5 mm to 5.0 mm. This thickness is the local thickness of the fibrous layers (not to be confused with the pleat height of the pleated web), as indicated by thickness "t" of FIG. 1. In various embodiments, the thickness may be at least 0.7, 1.0, 1.5, or 2.0 mm. In further embodiments, the thickness may be at most 4.0, 3.0, or 2.5 mm.

As noted, air filter assembly 1 comprises primary filtration layer 100 and prefilter layer 10. Filter assembly 1 is configured so that air to be filtered passes through prefilter layer 10 before entering primary filtration layer 100. Also as noted, primary filtration layer 100 comprises charged meltblown fibers (i.e., electret fibers) 111; prefilter layer 10 comprises charged meltspun fibers (i.e., electret fibers) 11.

The fibers 11 of prefilter layer 10 will exhibit a larger diameter, on average, than the fibers 111 of primary filtration layer 110. In some embodiments, such a distinction may be characterized by way of the Effective Fiber Diameter (EFD) of the fibers of each layer. In various embodiments, the ratio of the EFD of the meltspun fibers of the primary filtration layer to the EFD of the meltblown fibers of the primary filtration layer may be at least 1.5, 2.0, 2.5. 3.0, 4.0, 5.0, or 6.0. In further embodiments, such a ratio may be at most 20, or 10.

Although in many instances the Effective Fiber Diameter may be a convenient way to characterize the average fiber sizes of the respective layers, in some embodiments the fiber sizes can be characterized by way of the Actual Fiber Diameter (AFD) of each layer. Methods for measuring the AFD of a fibrous layer are found e.g. in U.S. Pat. No. 8,162,153. In various embodiments, the ratio of the AFD of the meltspun fibers of the primary filtration layer to the AFD of the meltblown fibers of the primary filtration layer may be at least 1.5, 2.0, 2.5. 3.0, 4.0, 5.0, or 6.0. In further embodiments, such a ratio may be at most 20, or 10. Ordinary artisans will be aware that for fibrous webs, the EFD and AFD will often scale with each other in a relatively well-behaved manner; therefore, in some instances a value of an EFD may be used to infer a general range of the value of an AFD, or vice versa (AFD and EFD and their relationships are discussed in detail in the above-mentioned U.S. Pat. No. '153 patent).

In some embodiments the meltblown fibers 111 of primary filtration layer 100 may exhibit an EFD and/or an AFD that is 10 microns or less (such fibers are often referred to as microfibers). In some embodiments the meltspun fibers 11 of prefilter layer 10 may exhibit an EFD and/or an AFD that is greater than 10, 15, 20, 25, or 30 microns. Ordinary artisans will appreciate that "microfibers" (in particular, charged microfibers) are typically far more effective at filtering fine particles (e.g. particles of less than 2.5, 2.0, or 1.0 microns in size) from air, in comparison to larger fibers (even if the larger fibers are likewise charged).

Figure 3:
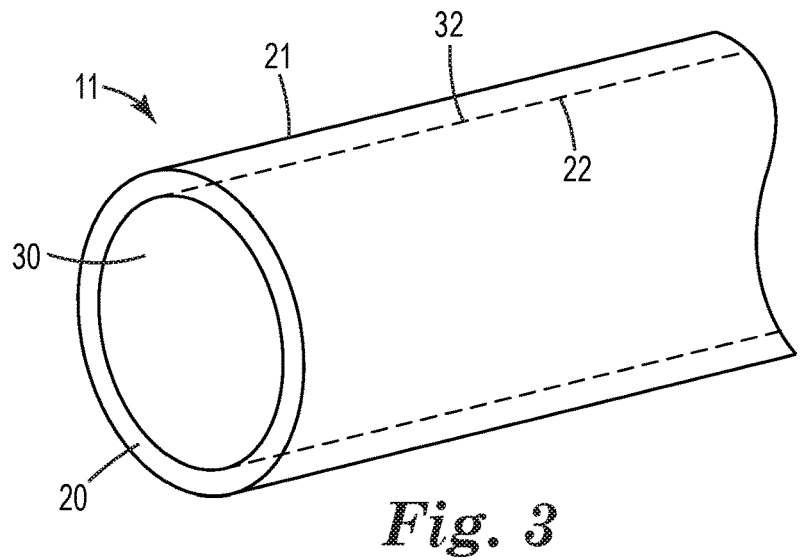
FIG. 3 is a side-perspective cross-sectional view of a portion of an exemplary sheath-core fiber that may find use in a prefilter of pleated multilayer air filter assembly.

Prefilter layer 10 comprises charged meltspun fibers 11 as noted above. At least some of these fibers will comprise a radially outer surface (e.g. surface 21 of FIG. 3) of polymethylpentene (PMP). In various embodiments, at least 80, 90, 95, 98, or essentially 100% of these fibers (by number-average) will comprise a polymethylpentene outer surface. In some embodiments, such fibers may be polymethylpentene fibers (i.e., they may be made up of polymethylpentene throughout their entire radial thickness).

In other embodiments, such fibers 11 may be sheath-core fibers, comprising a polymethylpentene sheath 20 surrounding a core 30 of some other polymer (e.g. polypropylene). As will be familiar to those of skill in the art and as indicated in generic representation in FIG. 3, a sheath-core fiber includes a core portion 30 (a first component) that extends the length of the long axis of the fiber. Core portion 30 is circumferentially surrounded by a sheath portion 20 (a second component) that also extends the length of the long axis of the fiber. Inner surface 22 of sheath 20 faces, and is bonded to, outer surface 32 of core 30. Typically, no portion of outer surface 32 of core 30 will be exposed, except for e.g. cases in which statistical fluctuations in a real-life production process may cause occasional exposed areas of surface 32 to be present. That is, for the vast majority of fibers 11, the radially outer surface 21 of sheath 20 will provide the outer surface of fiber 11.

By definition, a bicomponent sheath-core fiber 11 as disclosed herein will exhibit a sheath-core ratio of from 5:95 to 85:15. This ratio is a volumetric ratio (e.g., a sheath-core ratio of 40:60 denotes that the volumetric ratio of sheath material to core material is 40:60) that can be obtained e.g. by microscopy of fibers in cross-sectional view. If desired, any such volumetric ratio may be converted to a mass ratio by straightforward calculations using the density of the respective sheath and core materials; the mass ratio may differ slightly from the volumetric ratio if the sheath material and core material differ in density. (For example, a volumetric sheath-core ratio of 20:80 for a polymethylpentene sheath and a polypropylene core would be expected, based on the density of the materials, to correspond to a mass sheath-core ratio of approximately 18:82.) In various embodiments, a bicomponent sheath-core fiber may exhibit a sheath-core volumetric ratio of at least 10:90, 15:85, 20:80, or 25:75. In further embodiments, a bicomponent sheath-core fiber may exhibit a sheath-core volumetric ratio of at most 60:40, 40:60 or 30:70. (It is noted that the term "bicomponent" is used for convenience and signifies at least two components; it embraces e.g. three or more components.) A polymethylpentene sheath 20 of a fiber 11 may have any suitable thickness.

In various embodiments, a sheath of a fiber 11 may be from 1 to 8 microns, e.g. from 1 to 5 microns or 1 to 3 microns, in average radial thickness. Ordinary artisans will appreciate that the use of sheath-core fibers may offer cost advantages considering that polymethylpentene is typically more expensive than polymers such as e.g. polypropylene. (In other words, the sheath-core approach may allow the total amount of polymethylpentene to be minimized.) Furthermore, the use of sheath-core fibers may allow the use of core materials (e.g. polypropylene) that are e.g. significantly stiffer than polymethylpentene; such an arrangement may enable the prefilter to render the multilayer assembly much more amenable to being pleated, and to maintaining a pleated configuration, in comparison to e.g. an assembly in which the prefilter fibers are polymethylpentene fibers. Other advantages that are not predictable according to the background knowledge of ordinary artisans will be discussed later herein.

Whether used as polymethylpentene fibers, or as a polymethylpentene sheath surrounding a core of some other material, any suitable polymethylpentene may be used in the prefilter fibers. Ordinary artisans will be aware that polymethylpentene is often provided as a copolymer that includes, along with the polymethylpentene monomer units, a suitable amount of other monomer units (e.g. to improve the processability or other property of the resulting material). Thus, the term "polymethylpentene" as used herein permits the presence of various other monomer units, e.g. alkylene units (e.g., ethylene, propylene, butylene, pentylene, hexylene, isooctylene), e.g. at an amount of up to e.g. 2, 4, 6, 8 or 10 weight percent. Any such polymethylpentenes are thermoplastic organic polymeric materials that are available in many grades that are suitable for extrusion (including coextrusion) e.g. in the form of meltspinning. In many embodiments it may be advantageous to use neat polymethylpentene as a sheath or fiber, to obtain the benefits of having as much polymethylpentene as possible exposed on the radially outward surfaces of the prefilter fibers, as discussed later herein. However, in some embodiments the polymethylpentene may be e.g. blended with a suitable extrudable thermoplastic organic polymeric material. Such arrangements are permitted as along as an effective amount of polymethylpentene is present. In various embodiments, in any such blend, the polymethylpentene will make up at least 50, 60, 70, 80, 90, 95, or 98 percent by weight of the polymethylpentene sheath (or of the polymethylpentene fiber).

Prefilter layer 10 may have any geometric, physical and/or mechanical properties that are commensurate with its role as a prefilter as discussed herein. Prefilter layer 10 will have an appropriate porosity, which can be characterized in terms of solidity. "Solidity" refers to a dimensionless fraction (reported in percent) that represents the proportion of the total volume of the fibrous web that is occupied by the solid (e.g. polymeric fibrous) material. Loft is 100% minus solidity and represents the proportion of the total volume of the web that is unoccupied by solid material. Methods of measuring such parameters are presented in the Examples. As disclosed herein, prefilter layer 10 may exhibit a solidity of from 4.0% to 20.0% (i.e. a loft of from 96.0% to 80%). In various embodiments, a prefilter as disclosed herein will exhibit a solidity of at least 5.0%, 6.0%, 7.0%, 8.0%, or 9.0%. In further embodiments, a prefilter as disclosed herein will exhibit a solidity of at most 17.0%, 15.0%, 13.0%, 12.0%, 11.0%, or 10.0%.

The term "basis weight" characterizes the weight of a fibrous web per unit area (areal density) and is reported as the weight of the fibrous web in grams per square meter. As disclosed herein, a prefilter 10 may exhibit a basis weight in the range of from 10 to 200 grams per square meter. In various embodiments, the basis weight may be at least 20, 30, 40, 50, 60, 70, or 80 grams per square meter. In further embodiments, the basis weight may be at most 160, 140, 130, 120, 110, 100, or 90 grams per square meter.

In at least some embodiments, assembly 1 as a whole, and individual fibrous web layers 10 and 100 thereof, will be substantially non-fluorinated. The degree of fluorination of a material (e.g. a fiber) may be characterized by way of the atomic % fluorine present on the surfaces of the material, as measured using X-ray photoelectron spectroscopy (XPS) methods as described in detail in U.S. Patent Application Publication 2011/0162653, which is incorporated by reference in its entirety herein. By substantially non-fluorinated is meant that the average atomic % fluorine present on the surfaces of fibers 11 and/or 111 is less than 2.0. In further embodiments, the average atomic % fluorine present on the surfaces of fibers 11 and/or 111 will be less than 1.0, 0.5, 0.1, 0.05, or 0.01. The requirement that a fibrous web layer is substantially non-fluorinated will exclude most any web that has been plasma-fluorinated to any significant extent, and will exclude most any web whose fibers contain a non-trace amount (e.g. more than 0.1 weight percent) of fluorine-containing melt additive.

In many embodiments, a non-fluorinated web may be recognizable by way of the contact angle that it exhibits. By a contact angle is meant an advancing contact angle using hexadecane as a standard wetting fluid. A contact angle is thus a geometric measurement that may be evaluated, or estimated, by any of several possible methods. For example, contact angles may be obtained for a fibrous web using captive bubble methods described in Application Report AR251e, titled Surface Energy of Textiles, available from KRUSS GmbH. (Of course, contact angles for fibers and webs may be estimated by performing contact measurements on flat films of the same material.)

In many embodiments, a non-fluorinated prefilter layer 10 (or a non-fluorinated primary filtration layer 100) will exhibit a contact angle of less than 40 degrees. In contrast, webs whose fibers have been e.g. plasma fluorinated may exhibit contact angles of 40 degrees or far higher. It will be appreciated that a prefilter layer as disclosed herein can exert its advantageous effects (as discussed later herein) without necessarily requiring the fibers of the prefilter layer to exhibit extremely high contact angles of the type often found with fluorinated webs.

The fibers 11 of prefilter layer 10 (e.g. bicomponent sheath-core fibers) may be melt-spun using any suitable meltspinning apparatus, such as those described e.g. in U.S. Pat. Nos. 8,240,484 and 8,506,669. Any such meltspinning apparatus and process will subject the fibers to an attenuation process (performed by an attenuator e.g. such as that described in U.S. Pat. No. 6,607,624) that will "draw" the fibers to impart the physical properties characteristic of meltspun fibers. (As noted earlier herein, such properties allow meltspun fibers to be distinguished from, for example, meltblown fibers, which do not undergo this type of drawing.) It will be appreciated that meltspun fiber webs have significant advantages over meltblown fiber webs. For example, meltspun fibers are typically quite strong due to the drawing process, which property (e.g. along with a desirably chosen diameter of the meltspun fibers) can render a fibrous layer (or a multilayer assembly comprising such a layer) very amenable to pleating. In contrast, meltblown fibers are so weak that a stand-alone meltblown web is typically not pleatable.

Meltspun fibers 11 (e.g. sheath-core fibers), after being collected as a mass of fibers, can be bonded together to form a coherent web by any suitable bonding process. (This combination of meltspinning and bonding accounts for the origin of the term "spunbonded"; the fibers are melt-spun and are then bonded to each other.) Thus, at least some fibers of prefilter layer 10 will be bonded to some other fibers of the prefilter layer. In many convenient embodiments, such bonding of fibers 11 may take the form of autogenous bonding. Autogenous bonding, as noted earlier, is melt-bonding of fibers performed at an elevated temperature (e.g., as achieved by use of an oven or a stream of heated-temperature air) without the application of solid contact pressure onto the web. Autogenously-bonded fibers will be easily identified as fibers that are melt-bonded directly together (without the presence of e.g. latex or particulate binders) in the absence of compressed/flattened areas that would result from solid contact pressure bonding (e.g. ultrasonic bonding or calendering). Fibers 11 can be autogenously bonded using any suitable apparatus, e.g. a controlled-heating device of the general type described in U.S. Patent Application Publication No. 2008/0038976.

Other potential bonding methods that may be used (e.g. to augment autogenous bonding, or in place of such bonding), include e.g. crosslapping, stitchbonding, needletacking, hydroentangling, chemical bonding, and/or thermal bonding. (It is noted that any such method may be used to bond, or otherwise strengthen, multilayer assembly 1 as a whole, regardless of any method that may have been used to bond prefilter 10.) It must be ensured that any such bonding does not unacceptably affect the filtration properties of the resulting multilayer air filter assembly (e.g. by introducing pinholes or the like). In some embodiments, autogenous bonding will be the only type of bonding that is performed on the fibers 11 of prefilter layer 10, with no other type of bonding being used.

Fibers 11 of prefilter 10 (whether they are e.g. sheath-core fibers, or PMP fibers), are charged, meaning that the fibers exhibit long-lived, at least quasi-permanent, electric charges. Such charged fibers will be referred to herein in general as electret fibers. In some embodiments some or all such charges may reside at or near a radially outer surface (e.g. surface 21) of the fibers. (However, this may not always be the case, as discussed later herein.) Such fibers may be charged (most conveniently, after the fibers have been collected and formed into a coherent web) by any suitable charging method, for example by hydrocharging, corona charging, by a combination of corona charging and hydrocharging (in any order) and so on.

In further detail, any charging method known in the art may be used. For example, charging may be carried out in a variety of ways, including tribocharging and corona discharge. In some embodiments, the fibers 11 of prefilter 10 may be capable of being charged by corona discharge alone, particularly DC corona discharge, without the need of any additional charging method. Examples of potentially suitable corona discharge processes are described in U.S. Pat. Re. No. 30,782 (van Turnhout), U.S. Pat. Re. No. 31,285 (van Turnhout), U.S. Pat. Re. No. 32,171 (van Turnhout), U.S. Pat. No. 4,215,682 (Davis et al.), U.S. Pat. No. 4,375,718 (Wadsworth et al.), U.S. Pat. No. 5,401,446 (Wadsworth et al.), U.S. Pat. No. 4,588,537 (Klaase et al.), U.S. Pat. No. 4,592,815 (Nakao), U.S. Pat. No. 6,365,088 (Knight et al.), British Pat. 384,052 (Hansen), U.S. Pat. No. 5,643,525 (McGinty et al.), Japanese Pat. No. 4,141,679 B2 (Kawabe et al.). Further methods are discussed by M. Paajanen et. al. in *Journal of Physics D: Applied Physics* (2001), vol. 34, pp. 2482-2488, and by G. M. Sessler and J. E. West in *Journal of Electrostatics* (1975), 1, pp. 111-123.

Another technique that can be used to charge the fibers 11 of prefilter layer 10 is hydrocharging. Hydrocharging of a fibrous layer is carried out by contacting the fibers with water in a manner sufficient to impart a charge to the fibers, followed by drying of the web. One example of hydrocharging involves impinging jets of water or a stream of water droplets onto the web at a pressure sufficient to provide the web with filtration enhancing electret charge, and then drying the web. The pressure necessary to achieve optimum results varies depending on the type of sprayer used, the type of polymer from which the web is formed, the type and concentration of additives to the polymer, the thickness and density of the web and whether pre-treatment, such as corona surface treatment, was carried out prior to hydrocharging. Generally, water pressures in the range of about 10 to 500 psi (69 to 3450 kPa) are suitable. The jets of water or stream of water droplets can be provided by any suitable spray device. One example of a useful spray device is the apparatus used for hydraulically entangling fibers. An example of a suitable method of hydrocharging is described in U.S. Pat. No. 5,496,507 (Angadjivand et al.). Other methods are described in U.S. Pat. No. 6,824,718 (Eitzman et al.), U.S. Pat. No. 6,743,464 (Insley et al.), U.S. Pat. No. 6,454,986 (Eitzman et al.), U.S. Pat. No. 6,406,657 (Eitzman et al.), and U.S. Pat. No. 6,375,886 (Angadjivand et al.). The hydrocharging of the web may also be carried out using the methods disclosed in the U.S. Pat. No. 7,765,698 (Sebastian et al.).

In embodiments in which at least some of the prefilter fibers are sheath-core fibers, the core material may be chosen to be capable of retaining a high quantity of trapped electrostatic charge. Typically, such materials (e.g. thermoplastic organic polymeric materials) have a DC (direct current) resistivity of greater than $10^{14}$ ohm-cm at the temperature of intended use. Polymers capable of acquiring a trapped charge include polyolefins such as polypropylene and polyethylene (e.g., HDPE, LDPE, LLDPE, VLDPE; ULDPE, UHMW-PE grades); polyvinyl chloride; polystyrene; polycarbonates; polyesters, including polylactides; and perfluorinated polymers and copolymers. Particularly useful materials include polypropylene. Examples of suitable thermoplastics include polypropylenes available as, for example, ESCORENE PP 3746G commercially available from Exxon-Mobil Corporation, Irving, Texas; TOTAL PP3960, TOTAL PP3860, and TOTAL PP3868 commercially available from Total Petrochemicals USA Inc., Houston, Texas; METOCENE MF 650W commercially available from LyondellBasell Industries, Inc., Rotterdam, Netherlands.

Electret fibers 11 of prefilter layer 10 may comprise one or more additives that enhance the ability of the fibers to have charges formed therein or thereon, and to maintain such charges over long periods of time (e.g., weeks, months or years). Such additives will be referred to herein as charge-enhancing additives. Many charge-enhancing additives for making electret-containing fibers are known in the art. Exemplary charge-enhancing additives may include pigments, light stabilizers, primary and secondary antioxidants, metal deactivators, hindered amines, hindered phenols, metal salts, phosphite triesters, phosphoric acid salts, fluorine-containing compounds, and combinations thereof (In other words, at least some materials that have other known functions, e.g. that serve as antioxidants or light stabilizers, may also be useful as charge-enhancing additives, as will be well understood by ordinary artisans.)

Exemplary charge-enhancing additives include thermally stable organic triazine compounds or oligomers, which compounds and/or oligomers contain at least one nitrogen atom in addition to those in the triazine ring, see, for example, U.S. Pat. Nos. 6,268,495; 5,976,208; 5,968,635; 5,919,847; and 5,908,598 all to Rousseau et al. Another charge-enhancing additive known to enhance electret formation and/or stabilization is "CHIMASSORB 944: (poly [[6-(1,1,3,3,-tetramethylbutyl) amino]-s-triazine-2,4-diyl] [[(2,2,6,6-tetramethyl-4-piperidyl) imino] hexamethylene [(2,2,6,6-tetramethyl-4-piperidyl) imino]]), available from BASF, Ludwigshafen, Germany. The charge-enhancing additives may be N-substituted amino aromatic compounds, particularly tri-amino substituted compounds, such as 2,4,6-trianilino-p-(carbo-2'-ethylhexyl-1'-oxy)-1,3,5-triazine, available as UVINUL T-150 from BASF, Ludwigshafen, Germany. Another charge additive is 2,4,6-tris-(octadecylamino)-triazine, also known as tristearyl melamine ("TSM"). Further examples of charge-enhancing additives are provided in U.S. Patent Application Publication Nos. 2011/0162653 and 2011/0137082; and, in U.S. Pat. Nos. 8,613,795, 7,390,351, 5,057,710, 4,652,282, 4,789,504, and 8,790,449, all of which are incorporated by reference in their entirety herein.

In some embodiments, the electrostatic charge-enhancing additive is selected from the group consisting of pigments, light stabilizers, primary and secondary antioxidants, metal deactivators, hindered amines, hindered phenols, metal salts, phosphite triesters, phosphoric acid salts, fluorine-containing compounds, and combinations thereof. In many convenient embodiments, any such charge-enhancing additive or additives may be incorporated into the thermoplastic material that will form a fiber 11, as a melt additive.

In cases in which fibers 11 of prefilter 10 are sheath-core fibers, in some embodiments a charge-enhancing additive or additives may be included in the core material only. In other embodiments a charge-enhancing additive or additives may be included in the sheath material only. In still other embodiments a charge-enhancing additive or additives may be included in the core material and the sheath material.

Charge-enhancing additive(s) can be used in any suitable amount. Often, a charge-enhancing additive or additives may be present in an amount ranging from 0.1 to 3% by weight, 0.1 to 2% by weight, 0.2 to 1.0% by weight, or 0.25 to 0.5% by weight, based on the weight of the material (e.g. fiber material, core material, or sheath material) into which the additive is incorporated.

As noted, multilayer assembly 1 comprises a primary filtration layer 100 in addition to the above-described prefilter layer 10. Primary filtration layer 100 comprises meltblown fibers 111 which, as discussed earlier herein, are formed by extruding molten filaments out of a set of orifices into converging high velocity air streams introduced by way of air-blowing orifices located in close proximity to the extrusion orifices. Such meltblown fibers do not undergo the type of attenuation/drawing that is experienced by meltspun fibers and are distinguishable from meltspun fibers.

As noted, the fiber size (diameter) of fibers 111 of primary filtration layer 100 will be smaller than that of fibers 11 of prefilter 10, whether characterized e.g. by an Effective Fiber Diameter and/or an Actual Fiber Diameter as discussed earlier herein. Primary filtration layer 100 may be characterized in similar manner to prefilter layer 10, in terms of e.g. solidity, basis weight, and so on. In various embodiments, primary filtration layer 100 may exhibit a solidity of from e.g. 5.0, 6.0, 7.0 or 8.0%, to 12, 11, 10, or 9.0%. In various embodiments, primary filtration layer 100 may exhibit a basis weight of from e.g. 10, 20 or 30 grams per square meter to 80, 70, 60 or 50 grams per square meter. In many embodiments fibers 111 of layer 100 may be monocomponent fibers (rather than e.g. bicomponent fibers) made of any suitable thermoplastic organic polymeric material that is amenable to being meltblown and charged. In many embodiments, polypropylene will be suitable; however, any other material may be used. Potentially suitable materials are disclosed e.g. in U.S. Provisional Patent Application 62/867,941 and in the resulting PCT Application PCT/IB2020/055548; and, in U.S. Provisional Patent Application 62/867,933 and in the resulting PCT application PCT/IB2020/055984, all of which are incorporated by reference in their entirety herein.

In some embodiments, other fibers (e.g., staple fibers) may be intermingled among the meltblown fibers of layer 100, e.g. in the general manner described in U.S. Patent Application Publication No. 2011/0162653. In other embodiments, the meltblown fibers are the only fibers present in layer 100. In many embodiments, primary filtration layer 100 may be substantially non-fluorinated in the manner previously described with regard to prefilter layer 10. Likewise, in many embodiments primary filtration layer may exhibit a contact angle that is e.g. less than 40 degrees, in the manner previously described. Primary filtration layer 100 and the fibers 111 thereof may be charged in similar manner (via any of the apparatus and methods previously described earlier herein) as discussed with regard to prefilter layer 10. Similarly, the fibers 111 of layer 100 may comprise one or more charge-enhancing additives, which may be e.g. any of the general types or specific compositions disclosed earlier herein.

A multilayer air filter assembly 1 as disclosed herein may be prepared in any suitable manner. In some convenient embodiments, a prefilter layer 10 may be prepared by meltspinning fibers 11, collecting the fibers (e.g. on a moving carrier), and then bonding (e.g. autogenously bonding) the fibers 11 to form a coherent web. In some embodiments, such a web may be stored (e.g. in roll form) for deposition of a meltblown primary filtration layer 100 thereonto at a later time.

However, in some convenient embodiments, the formation of a meltblown primary filtration layer 100 atop prefilter layer 10 may be performed in-line with the process of forming prefilter layer 10, without layer 10 ever having been e.g. stored in roll form. Such an approach may rely on a production line that has a meltblowing unit in tandem with a meltspinning unit. In some such production lines, a bonding unit (e.g. a through-air bonder that performs autogenous bonding) may be positioned between the meltspinning unit and the meltblowing unit to bond the meltspun fibers to form prefilter layer 10. Fibers 111 may then be meltblown onto an exposed major surface of prefilter layer 10, with prefilter layer 10 thus acting as a receiving substrate onto which fibers 111 are deposited.

In some embodiments, fibers 111 may be sufficiently soft or tacky (and/or, fibers 11 may be soft or tacky by virtue of having just been exposed to an autogenous bonding process) that fibers 111 may bond to fibers 11 to at least a certain extent merely due to fibers 111 coming into contact with fibers 11. However, in some embodiments, one or more secondary bonding processes may be performed to ensure that fibers 11 are adequately bonded to fibers 111 (that is, to ensure that primary filtration layer 100 is adequately bonded to prefilter layer 10). Any such secondary bonding process may take the form of e.g. autogenous bonding (e.g. by way of a through-air bonder), heated calendering of the layers (e.g. to promote the formation of numerous spot-bonds that are distributed throughout the length and width of the resulting multilayer assembly), or the like. It will thus be appreciated that in some embodiments, a production line may have two separate bonders, one to bond the meltspun fibers together, and a secondary bonder to ensure that the meltblown fibers are bonded to the meltspun fibers. Any such secondary bonding process, relying on whatever method of bonding, will be distinguished from a method in which a preexisting primary filtration layer is laminated (e.g. adhesively laminated) to a preexisting prefilter layer.

The result of these processes will be a multilayer assembly. In some embodiments, the individual layers 10 and 100 or the fibers thereof may have been separately charged before forming the multilayer assembly. However, in some convenient embodiments layers 10 and 100 may be charged at the same time, as a multilayer assembly, using e.g. any of the previously-recited charging methods (this will be referred to as co-charging). In some embodiments the multilayer assembly may be stored (e.g. in roll form) prior to being charged. However, in some embodiments, the charging may be performed in-line with the meltspinning, bonding and/or meltblowing processes, without the multilayer assembly ever having been stored prior to being charged. Thus for example, a hydrocharging unit, a corona-charging unit, or both, may be present in-line in the fibrous-web-production line (noting that if hydrocharging and corona-charging are both performed, they may be performed in any desired order). Such an arrangement can provide that fibers 11 of prefilter layer 10, and fibers 111 of primary filtration layer 100, are charged in a single operation, without having to perform separate charging operations on each individual layer.

The resulting charged multilayer assembly may then be pleated. In some embodiments the pleating may be performed in-line with the above operations. However, in some embodiments the charged multilayer assembly may be stored (e.g. in roll form) and pleated at a later time. This can advantageously eliminate, for example, any need to match the speed at which a pleating unit processes the multilayer assembly with the speed at which the web-production and/or charging units operate.

Pleating can increase the surface area available for air filtration and thus improve the ability to remove particles from a stream of flowing air, without significantly increasing the pressure drop required to pass the flowing air through the fibrous layers. In fact, it has been found that for a given airflow, pleating will typically lead to a lower pressure drop compared to a flat web. The geometric pleating parameters (pleat height and pleat spacing) may be chosen e.g. within of the ranges disclosed earlier herein.

The resulting pleated charged multilayer air filter assembly can then be stored, can be further processed (e.g. converted) into individual piece-parts, and so on. In some embodiments, a perimeter support frame may be mounted on perimeter edges of an individual piece-part to form a framed air filter. Any such air filter (whether framed or unframed) may find use in any circumstance in which it is desired to filter particles from moving air (e.g. in a room air purifier, in a forced-air handling system such as a residential or commercial HVAC system, and so on).

In some embodiments, a multilayer air filter assembly 1 will only include the prefilter layer 10 and the primary air filtration layer 100, with the primary air filtration layer serving to perform particle-filtration of the air and with no other layers being present. In other embodiments, at least one additional layer may be present, e.g. a sorbent layer that comprises sorbent particles, e.g. activated carbon, configured for the removal of gases, vapors, odors and the like. In such embodiments, any such additional layer will be co-pleated with the prefilter layer and the primary filtration layer.

In some embodiments, a pleated multilayer air filter assembly as disclosed herein may be self-supporting. By this is meant that the pleated assembly, when placed (e.g. with a perimeter support frame) in a conventional perimeter-holding fixture of a forced-air (e.g. heating-ventilation-air-conditioning or HVAC system), is able to withstand the forces developed when air impinges on the upstream face of the pleated web to develop a pressure drop of at least 0.2 inch of water when tested in the manner described in the Examples section of U.S. Pat. No. 9,174,159. By able to withstand such forces means that the pleats do not collapse, bow, deform, becomes dislodged, rupture, or the like, so as to render the performance of the air filter media unsatisfactory. In some embodiments, the pleated air filter assembly may be non-self-supporting and/or may comprise one or more pleat-stabilizing members, e.g. "bridging" filaments of the general type disclosed in U.S. Patent Application Publication No. 2019/0217239, that can assist in stabilizing the pleated layers against the forces of moving air.

Advantages Imparted by Presence of Prefilter

Ordinary artisans will appreciate that a prefilter as described herein may provide certain advantages that are expected or predictable. For example, a prefilter comprising fibers that are meltspun and are larger in diameter than the meltblown fibers of the primary filtration layer, will typically be very strong and stiff in comparison to the meltblown primary filtration layer, and will thus render the resulting multilayer assembly more amenable to being pleated. However, the present work has revealed that the use of a prefilter layer as disclosed herein (i.e. with the fibers of the prefilter layer comprising polymethylpentene and being charged) can provide other advantages that are unexpected.

Specifically, it has been found that the presence of a charged, polymethylpentene-containing prefilter can reduce the susceptibility of the charges of a primary filtration layer to being deactivated by contaminants. In other words, such a prefilter can protect a charged primary filtration layer from being compromised by contaminants such that the filtration performance of the primary filtration layer deteriorates.

Such performance can be characterized by way of a Media CCM test as described in the Examples herein. The Media CCM test (as described in U.S. Provisional Patent Application No. 62/886,129 and in the resulting International (PCT) Published Application WO2021//028851 is based on China National Standard GB/T 18801-2015 for testing room air purifier performance, but focuses on the performance of an air filter itself rather than evaluating the combined effect of the air filter and the room air purifier that the air filter is used in.

In the Media CCM test, a sample of filter media (e.g., a multilayer air filter assembly or an individual layer for possible use in such an assembly) is exposed to greater and greater amounts of a contaminant (cigarette smoke). The filtration performance of the filter media is monitored periodically as a function of this cumulative exposure to the contaminant. The filtration performance is measured in terms of the Capture Efficiency (efficiency of removal of NaCl challenge particles) as described in the U.S. '129 provisional application. The test is concluded when the Capture Efficiency has dropped to half of its initial value (that is, the value before any exposure to the contaminant). The Media CCM value is thus a measure of the total amount of contaminant to which the filter media has to be exposed to cause the particle-filtration performance to drop by half. A higher Media CCM value indicates that a filter media is able to withstand a greater level of contamination before its filtration performance drops significantly.

Figure 4:
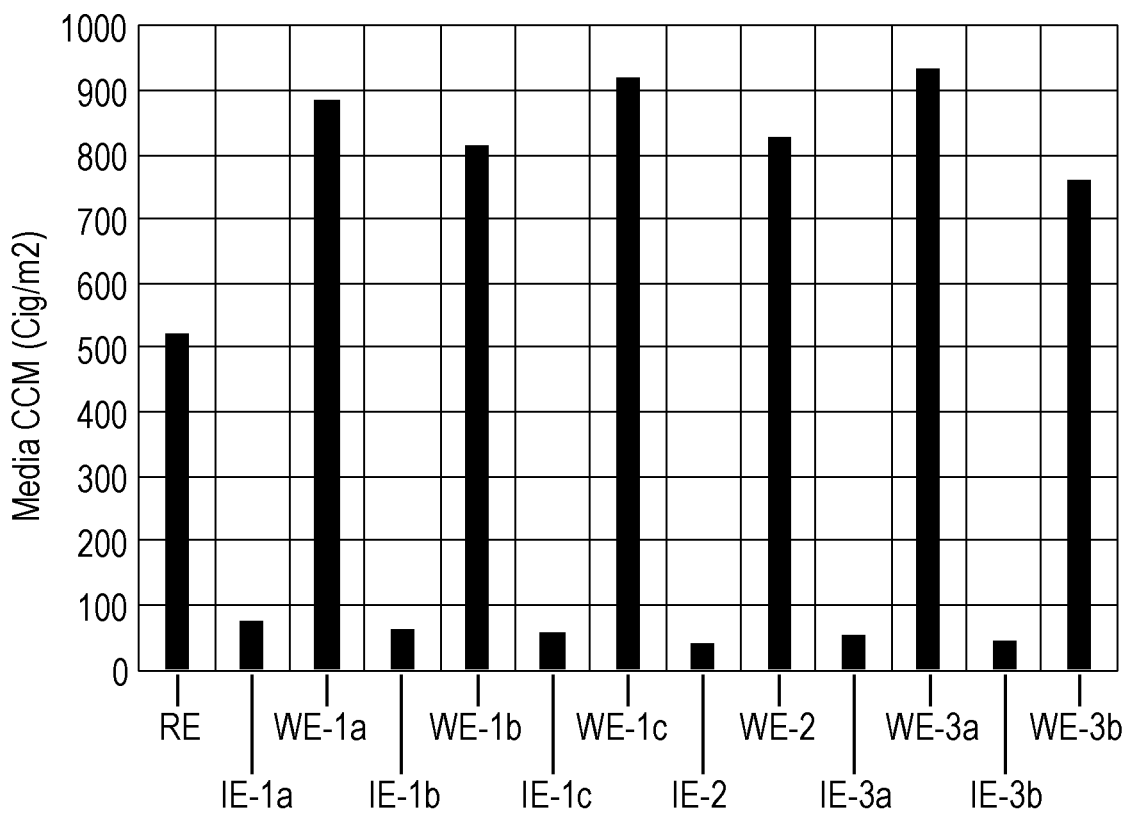
FIG. 4 presents filtration performance data for various Examples as discussed herein.

The Examples presented later herein illustrate the advantageous effect of the herein-disclosed prefilters. A Reference Example is provided which is a commercially available primary filtration layer in the form of a charged meltblown fibrous web (capable of performing HEPA filtration) and which exhibits a Media CCM value of approximately 520 (reported in units of cigarettes per square meter of web area). Media CCM values are then presented for several inventive prefilters (all such prefilters, when tested alone, are referred to as Illustrative Examples); the prefilters when tested in a stand-alone configuration typically exhibit a Media CCM value in the range of 40-70. Working Examples are then presented in which the Illustrative Example prefilters are each combined with a Reference Example meltblown primary layer to form a multilayer air filter assembly. As is evident from FIG. 4, augmenting a primary filtration layer with an inventive prefilter layer as disclosed herein produces a multilayer air filtration assembly that exhibits a Media CCM value far higher than that which would be expected based on the individual Media CCM values of the prefilter and the primary filtration layer. For example, FIG. 4 illustrates that an inventive prefilter with a Media CCM value of 55 (Illustrative Example IE-3a) can be combined with a primary filtration layer with a Media CCM value of 520 (Reference Example RE) to provide a multilayer air filter assembly that exhibits a Media CCM value of 933 (Working Example WE-3a).

These surprising results indicate that the inventive prefilter and the primary filter layer act synergistically with the prefilter protecting the primary filtration layer (from being deactivated by contaminants) to a far greater extent than would be expected. Furthermore, these advantageous effects may be obtained without the use of relatively expensive approaches involving e.g. fluorinated materials. It is still further noted that the advantageous effects of the inventive prefilter in use in combination with a primary filtration layer are not considered to be limited to, for example, the use of any particular charging method and/or any particular charge-enhancing additive in the prefilter fibers (or in the fibers of the primary filtration layer).

The present work has revealed that the above-discussed unexpected effects require that the fibers of the prefilter layer must be charged. While not wishing to be limited by theory or speculation, it seems that the presence of charges in the prefilter fibers, along with the surface energetics of the polymethylpentene that is present on the surfaces of the prefilter fibers, somehow acts to scavenge contaminants or to otherwise negate the effects of the contaminants so that the contaminants do not unduly affect the primary filtration layer. Again while not wishing to be limited by theory or speculation, it is postulated that at least some such contaminants may take the form of droplets (e.g. aerosols) of oily liquid that can land on the surface of a fiber and can wet out the surface of the fiber so as to be able to travel along the surface of the fiber to at least some extent. Such a contaminant may include e.g. charged and/or polar constituents so that if the contaminant comes sufficiently close to an electret charge of the fiber, the electret charge may be neutralized or otherwise deactivated.

Again while not wishing to be limited by theory or speculation, it may be that polymethylpentene provides a surface that is rather oleophobic. Thus, oily-liquid droplets may be attracted to the prefilter fibers (by virtue of the electret charges that are present in or on the fibers) and may thus land on the fibers; however, such oily liquids may have little tendency to move along the fibers in a way that would cause the charges on the prefilter fibers to be successively encountered and neutralized. (Rather, the oily liquid may "bead up" and remain in its initial location.) It thus may be that large amounts of oily liquids may be able to accumulate on the surfaces of the prefilter fibers without deactivating the electret charges of the prefilter fibers in a way that would prevent the prefilter fibers from capturing additional quantities of oily liquids.

Regardless of the exact mechanism, the present work indicates that polymethylpentene-containing, charged prefilter fibers have a high ability to capture certain contaminants (e.g. oily liquids), combined with an ability to hold large amounts of such contaminants. Such a combination of properties is quite advantageous as discussed herein. It is emphasized that such properties are not manifested in the Media CCM value of the prefilter alone (which is actually quite low); rather, it is only when such a prefilter is combined with a primary filtration layer that these advantageous properties of the prefilter are unexpectedly manifested.

The present work has yielded additional insights into the protective effects of the prefilter fibers. As discussed in detail in the Examples herein, Working Example WE-2 included charge-enhancing additives in both the core, and the sheath, of sheath-core fibers of the prefilter layer. Working Examples WE-1 and WE-3, in contrast, included charge-enhancing additives only in the core; no such additive was present in the sheath. Thus, in Working Examples WE-1 and WE-3, the majority of the electret charges would be expected to be "buried" in the core layer, beneath the sheath. (While the charging process would be expected to cause the formation of some electret charges in the sheath, it would be expected that the charges would be predominately associated with the charge-enhancing additives; that is, in the core.) Inspection of FIG. 4 reveals that Working Examples WE-1 (including samples WE-1a, WE-1b, and WE-1c) and WE-3 (including samples WE-3a and WE-3b) exhibited protective effects of a very similar nature to those exhibited by Working Example WE-2. These results indicate that the prefilter fibers do not necessarily have to have charges at or near the radially-outward surface of the fibers in order for the prefilter fibers to function as disclosed herein. In other words, it may not be necessary for the charges to be "exposed" on the radially outward surfaces of the fibers in order for the prefilter fibers to function. In fact, it is possible that it may even be advantageous for at least some of the electret charges of the prefilter fibers to be "buried" within the fibers, e.g. so that the electret charges are not easily accessible by any oily-liquid contaminants so as to be neutralized/deactivated by the oily liquid.

Thus, in some particular embodiments, charge-enhancing additive(s) may be present in the core of sheath-core fibers 11 of a prefilter 10. In some such embodiments, no charge-enhancing additive(s) may be present in the sheath of such fibers.

Another parameter that is often useful in characterizing the performance of filter media is the so-called Quality Factor (QF). Quality Factor is a measure of overall filtration performance that takes into account both the particulate removal that is achieved, and also the pressure drop that is required (hence the energy required) in order to pass air through the filter to achieve the particulate removal. Methods for measuring Quality Factor (using NaCl or DOP challenge particles) are described e.g. in U.S. Pat. No. 7,691,168, which is incorporated by reference herein in its entirety. The various prefilters disclosed in the Examples herein, when tested alone as Illustrative Examples (using NaCl challenge particles), exhibited Quality Factors in the range of approximately 0.5 to 0.8 (the units of QF are inverse pressure drop, i.e. 1/mm $H_2O$). The Reference Example meltblown primary filtration layer, when tested alone, exhibited a Quality Factor of approximately 0.63. The Working Example multilayer assemblies that were obtained from combining the prefilter layers with the primary filtration layer, exhibited Quality Factors in the range of approximately 0.6-0.7.

It is thus clear that the advantages in resistance to contaminants that accrue when using a prefilter as disclosed herein are not negated by any fall-off in filtration performance in terms of Quality Factor. Rather, the Quality Factors of the Working Example multilayer air filter assemblies are quite acceptable. It is however clear that the advantages that result from the presence of a prefilter layer upstream of a primary filtration layer are not manifested when these items are evaluated in terms of Quality Factor (since the Reference Example, the Illustrative Examples, and the Working Examples, all exhibit Quality Factors in a similar range). Rather, it is only the present work, in which the behavior of the filter layers in the presence of particular contaminants is evaluated as in Media CCM testing, that

EXAMPLES

Test Methods

Solidity, loft, basis weight, Effective Fiber Diameter, Actual Fiber Diameter can be obtained using the procedures presented in U.S. Pat. No. 8,162,153, which is incorporated by reference in its entirety herein. Quality Factors can be obtained using the procedures presented in U.S. Pat. No. 7,691,168, which is incorporated by reference in its entirety herein.

Media CCM

Media CCM tests are performed to evaluate the effects of a representative contaminant (cigarette smoke) on particle-filtration performance. The Media CCM test uses methods similar to those of the GB/T 18801-2015 China National Standard (which tests the cumulate clean mass (CCM) performance of an air purifier with an air filter installed therein) but is configured to evaluate the performance of an air filter alone rather than evaluating the combined effects of the air filter and the air purifier in which the air filter is installed.

In the Media CCM experiment, a 5.25-inch (13.3 cm) diameter circle of filter media is prepared (e.g. by die-cutting) and placed in a holder which leaves a 4.5 inch (11.4 cm) diameter circle of media exposed. The holder is placed inside a test chamber so that the test chamber is divided into two portions with the filter media sample being the only internal pathway therebetween.

A sample in the form of a cigarette or section thereof, with the filter removed, is burned inside one portion of the test chamber. During this process a fan is operating, which evacuates air from one portion of the test chamber and sends the air through an external conduit that leads to the other portion of the test chamber. The fan thus continually recirculates the air, pulling the smoke-laden air through the filter media sample. The fan is run continuously until the smoke appears (by visual observation) to be fully removed from the chamber. The test is then continued with a new cigarette sample, which process is repeated until the test is complete.

The ability of the filter media to capture particles is monitored at various steps of the cigarette smoke loading process (including an initial value, prior to exposure to cigarette smoke), by testing the Capture Efficiency (i.e., 100 minus Percent Penetration, reported in percent) of the filter media. The Capture Efficiency is tested with a TSI 8130 Automated Filter Tester using a NaCl aerosol at 85 liters per minute (face velocity of 14 cm/s).

A second order polynomial regression equation is applied to the cigarette quantity versus Capture Efficiency data to determine the point at which the Capture Efficiency has dropped to 50% of its initial value, consistent with the general approach of the GB/T Standard. The output of this test is referred to as the Media CCM Test, and is normalized to filter media area. In other words, the test results are presented in terms of the total number of cigarettes (per square meter of filter media area) that are required to cause the Capture Efficiency to drop by half.

The Media CCM test may be performed with standard Reference Cigarettes obtained from the University of Kentucky under the trade designation University of Kentucky, Tobacco-Health Research, Research Cigarettes Type 1R4F or Type 1R6F, or with commercially available cigarettes CAMEL brand cigarettes available from the R.J. Reynolds Tobacco Company, related work having indicated that all such cigarettes provide comparable results.

The Media CCM test (along with other tests such as Capture Efficiency, Percent Penetration, Quality Factor, and Solidity) is discussed in detail in U.S. Provisional Patent Application No. 62/886,129 and in the resulting International (PCT) Published Application WO2021/028851, both of which are incorporated by reference in their entirety herein.

Reference Example

A Reference Example (RE) fibrous air-filtration web was obtained of the general type available in the air filter products available from 3M Company, St. Paul, MN, under the trade designations FILTRETE TRUE HEPA ROOM AIR PURIFIER FILTER FAPF-F2-H and FAPF-A2-4. The web was a meltblown polypropylene electret web whose fibers included one or more charging additives. The web exhibited an Effective Fiber Diameter of approximately 4.9 microns, a basis weight of approximately 42 grams per square meter, and a solidity of approximately 8.1%.

Illustrative Examples

Illustrative Example (IE) fibers for prefilter webs were made using a melt-spinning line of the general type disclosed in U.S. Pat. No. 8,506,669, except that the melt-spinning line was fed by an extrusion apparatus that supplied two separate molten plastic materials to a melt-spinning die that included concentric orifices configured to produce bicomponent fibers in a sheath-core orientation. All of the fibers were sheath-core fibers of approximately 80:20 core-sheath ratio, with the core being polypropylene (Total 3860 from Total Petrochemicals) and with the sheath being polymethylpentene (TPX Grade DX820 from Mitsui Chemicals). These were nominal mass ratios (as established by metering pumps used to feed the respective molten materials to the extruder) which can be easily converted to volumetric ratios of the thus-produced bicomponent fibers. The fibers were extruded, drawn, and collected, and were then autogenously bonded using a through-air bonding unit (that supplied air at a temperature in the range of approximately 230° C.) of the general type described in U.S. Patent Application Publication No. 2008/0038976.

For the materials of Illustrative Examples IE-1 and IE-3, a charge-enhancing melt additive was included in the polypropylene (at approximately 0.1 wt. %) that would form the core of the sheath-core fibers, with no charge-enhancing additive being included in the polymethylpentene that would form the sheath of the sheath-core fibers. For Illustrative Example IE-2, the same charge-enhancing additive that was present in the core of Illustrative Examples IE-1 and IE-3, was present in the core (at the same level of approximately 0.1 wt. %). The fibers of Illustrative Example IE-2 also included a charge-enhancing additive (at approximately 1 wt. %) in the polymethylpentene sheath.

The IE-1 web exhibited an Effective Fiber Diameter of approximately 22 microns, a basis weight of approximately 102 grams per square meter, and a solidity of approximately 12%. The IE-2 web exhibited an Effective Fiber Diameter of approximately 27 microns, a basis weight of approximately 76 grams per square meter, and a solidity of approximately 10%. The IE-3 web exhibited an Effective Fiber Diameter of approximately 27 microns, a basis weight of approximately 80 grams per square meter, and a solidity of approximately 10%.

Various of these webs were charged according to various general methods. Illustrative Examples IE-1a, IE-1b, IE-2, and IE-3a were corona-charged (with IE-1a and IE-2 using a slightly modified corona-charging method in comparison to that used for IE-1b and IE-3a). Examples IE-1c and IE-3b were charged using a combination of corona-charging (using the method of Examples IE-1b and IE-3a) and hydrocharging (with the hydrocharging being performed first).

Working Examples

Various Working Example (WE) samples were generated by combining one of the above-listed Illustrative Example prefilter layers with a layer of the Reference Example primary filtration layer. For these pilot-scale studies, the layers were not bonded to each other; rather, for each Media CCM experiment an Illustrative Example prefilter layer and a Reference Example primary filtration layer were held firmly together in the holder of the Media CCM testing apparatus. However, as noted earlier, in actual, large-scale production it may be advantageous to bond such layers together in-line. Similarly, in these pilot-scale studies, the prefilter and the primary filtration layer were charged separately, whereas in large-scale production, it may be advantageous to charge the final multilayer assembly.

Media CCM Characterization

Various Working Examples (each corresponding to a sample of one of the above-listed Illustrative Example prefilter layers in combination with a sample of the Reference Example primary filtration layer) were characterized in a Media CCM test. The results of this testing are shown in FIG. 4, along with results for the Reference Example (RE) web and the Illustrative Example (IE) webs when tested individually. As evident in FIG. 4, and as referred to earlier, the Reference Example (RE) web exhibited a Media CCM value of approximately 520. The Illustrative Example (IE) webs exhibited Media CCM values in the range of 40-70. The Working Example (WE) multilayer assemblies exhibited Media CCM values in the general range of approximately 750 to approximately 950 (ranging from a low of 759 for Working Example WE-3b, to a high of 933 for Working Example WE-3a). These values were surprisingly high and could not have been predicted from the Media CCM values of the Reference Example and the Illustrative Examples.

Other

U.S. Provisional Patent Application 62/867,941 and the resulting PCT Published Application WO2020/261034; and, U.S. Provisional Patent Application 62/867,933 and the resulting PCT Published Application WO2020/261150, are referred to (and are all incorporated by reference in their entirety herein) in order to augment the above Examples and discussions. These documents present Examples that illustrate, for example, the use of various charging additives, further details of charging methods, and so on, which may further illustrate the principles demonstrated in the above Examples.

The foregoing Examples have been provided for clarity of understanding only, and no unnecessary limitations are to be understood therefrom. The tests and test results described in the Examples are intended to be illustrative rather than predictive, and variations in the testing procedure can be expected to yield different results. All quantitative values in the Examples are understood to be approximate in view of the commonly known tolerances involved in the procedures used.

It will be apparent to those skilled in the art that the specific exemplary elements, structures, features, details, configurations, etc., that are disclosed herein can be modified and/or combined in numerous embodiments. All such variations and combinations are contemplated by the inventor as being within the bounds of the conceived invention, not merely those representative designs that were chosen to serve as exemplary illustrations. To the extent that there is any conflict or discrepancy between this specification as written and the disclosure in any document that is incorporated by reference herein, this specification as written will control.

What is claimed is:

1. A pleated multilayer air filter assembly comprising a primary filtration layer and a prefilter layer that are bonded to each other and are co-pleated with each other,
   wherein the primary filtration layer comprises meltblown electret fibers,
   wherein the prefilter layer comprises meltspun, spunbonded electret fibers that comprise a radially outer surface comprising polymethylpentene with at least 95% of the meltspun, spunbonded electret fibers of the prefilter layer being bicomponent sheath-core fibers with a sheath of polymethylpentene and with a core of polypropylene,
   and,
   wherein a ratio of an Effective Fiber Diameter of the meltspun, spunbonded electret fibers of the prefilter layer to an Effective Fiber Diameter of the meltblown electret fibers of the primary filtration layer is at least 1.5.

2. The pleated multilayer air filter assembly of claim 1 wherein the meltspun, spunbonded electret fibers of the prefilter layer are autogeneously-bonded fibers.

3. The pleated multilayer air filter assembly of claim 1 wherein the pleated air filter assembly exhibits a pleat spacing of from 3 mm to 50 mm, a pleat height of from 5 mm to 50 mm, a solidity of from 4 to 20%, a basis weight of from 20 to 200 grams per square meter, and a thickness of from 0.5 mm to 5.0 mm.

4. The pleated multilayer air filter assembly of claim 1 wherein at least at least one of the sheath and the core comprises a charge-enhancing additive.

5. The pleated multilayer air filter assembly of claim 4 wherein the charge-enhancing additive is selected from the group consisting of pigments, light stabilizers, primary and secondary antioxidants, metal deactivators, hindered amines, hindered phenols, metal salts, phosphite triesters, phosphoric acid salts, fluorine-containing compounds, and combinations thereof.

6. The pleated multilayer air filter assembly of claim 1 wherein the core comprises a charge-enhancing additive.

7. The pleated multilayer air filter assembly of claim 1 wherein the sheath does not comprise a charge-enhancing additive.

8. The pleated multilayer air filter assembly of claim 1 wherein the melt-spun, spunbonded electret fibers exhibit an Effective Fiber Diameter of from 10 microns to 50 microns and a sheath-core volumetric ratio of from 5:95 to 85:15.

9. The pleated multilayer air filter assembly of claim 1 wherein a ratio of an Effective Fiber Diameter ratio of the meltspun, spunbonded fibers of the primary filtration layer to an Effective Fiber Diameter of the meltblown fibers of the primary filtration layer is at least 3.0.

10. The pleated multilayer air filter assembly of claim 1 wherein the pleated multilayer air filter assembly exhibits a Media CCM value of greater than 700.

11. The pleated multilayer air filter assembly of claim 1 wherein the pleated multilayer air filter assembly does not comprise any air-filtration layers other than the primary filtration layer and the prefilter layer.

12. The pleated multilayer air filter assembly of claim 1 further comprising a sorbent-containing layer that is co-pleated with the primary filtration layer and the prefilter layer.

13. The pleated multilayer air filter assembly of claim 1 wherein an upstream surface of the prefilter layer exhibits a contact angle of less than 40 degrees.

14. The pleated multilayer air filter assembly of claim 1 wherein the primary filtration layer and the prefilter layer are both at least substantially fluorine-free.

15. The pleated multilayer air filter assembly of claim 1 wherein the pleated multilayer air filter assembly is a framed air filter assembly comprising a perimeter support frame.

16. A room air purifier comprising the pleated multilayer air filter assembly claim 1.

* * * * *